US010696899B2

(12) United States Patent
Campbell et al.

(10) Patent No.: US 10,696,899 B2
(45) Date of Patent: Jun. 30, 2020

(54) LIGHT EMITTING SHELL IN MULTI-COMPARTMENT MICROCAPSULES

(71) Applicant: International Business Machines Corporation, Armonk, NY (US)

(72) Inventors: Eric J. Campbell, Rochester, MN (US); Sarah K. Czaplewski, Rochester, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/590,676

(22) Filed: May 9, 2017

(65) Prior Publication Data

US 2018/0327659 A1    Nov. 15, 2018

(51) Int. Cl.
| B32B 5/16 | (2006.01) |
| C09K 11/00 | (2006.01) |
| C08J 5/00 | (2006.01) |
| C01G 49/00 | (2006.01) |
| C01F 11/18 | (2006.01) |
| C01G 49/08 | (2006.01) |

(52) U.S. Cl.
CPC .............. *C09K 11/00* (2013.01); *C01F 11/18* (2013.01); *C01G 49/00* (2013.01); *C01G 49/0018* (2013.01); *C01G 49/08* (2013.01); *C08J 5/005* (2013.01); *B65D 2101/00* (2013.01)

(58) Field of Classification Search
CPC .............................. F21K 2/06; Y10T 428/2984
USPC ....................................................... 428/402.2
See application file for complete search history.

(56) References Cited

U.S. PATENT DOCUMENTS

| 3,481,790 A | 12/1969 | Duddy |
| 3,653,372 A | 4/1972 | Douglas |
| 3,656,372 A | 4/1972 | Chana |
| 4,095,583 A | 6/1978 | Petersen et al. |
| 4,233,402 A | 11/1980 | Maggio et al. |
| 4,273,671 A | 6/1981 | Allinikov |
| 4,278,837 A | 7/1981 | Best et al. |
| 4,598,274 A | 7/1986 | Holmes |
| 4,772,530 A | 9/1988 | Gottschalk |

(Continued)

FOREIGN PATENT DOCUMENTS

| CA | 918331 A | 1/1973 |
| CN | 103740978 A | 4/2014 |

(Continued)

OTHER PUBLICATIONS

Xiong et al., Towards Theranostic Multicompartment Microcapsules:in-situ Diagnostics and Laser-induced Treatment, Theranostics 2013, vol. 3, Issue 3, 141-151 (Year: 2013).*

(Continued)

*Primary Examiner* — Hoa (Holly) Le
(74) *Attorney, Agent, or Firm* — Patterson + Sheridan LLP

(57) ABSTRACT

A multi-compartment microcapsule emits photons when subjected to a stimulus. In some embodiments, the multi-compartment microcapsules have first and second compartments separated by an isolating structure adapted to rupture in response to the stimulus, wherein the first and second compartments contain reactants that come in contact and react to produce photons when the isolating structure ruptures.

18 Claims, 3 Drawing Sheets

(56) References Cited

U.S. PATENT DOCUMENTS

| | | | |
|---|---|---|---|
| 4,811,288 A | 3/1989 | Kleijne et al. | |
| 4,816,367 A | 3/1989 | Sakojiri et al. | |
| 5,169,707 A | 12/1992 | Faykish et al. | |
| 5,319,475 A | 6/1994 | Kay et al. | |
| 5,325,721 A | 7/1994 | Pendergrass, Jr. | |
| 5,406,630 A | 4/1995 | Piosenka et al. | |
| 5,508,893 A | 4/1996 | Nowak et al. | |
| 5,904,795 A | 5/1999 | Murakami et al. | |
| 5,904,796 A | 5/1999 | Freuler et al. | |
| 5,945,995 A | 8/1999 | Higuchi et al. | |
| 5,984,995 A | 11/1999 | White | |
| 6,114,413 A | 9/2000 | Kang et al. | |
| 6,217,213 B1 | 4/2001 | Curry et al. | |
| 6,235,148 B1 | 5/2001 | Courson, Jr. et al. | |
| 6,530,527 B1 | 3/2003 | Ahlers et al. | |
| 6,776,495 B2 | 8/2004 | Nomiyama | |
| 6,833,191 B2 | 12/2004 | Bayless | |
| 6,876,143 B2 | 4/2005 | Daniels | |
| 6,947,285 B2 | 9/2005 | Chen et al. | |
| 7,005,733 B2 | 2/2006 | Kommerling et al. | |
| 7,065,656 B2 | 6/2006 | Schwenck et al. | |
| 7,223,964 B2 | 5/2007 | Wiese et al. | |
| 7,247,791 B2 | 7/2007 | Kulpa | |
| 7,274,791 B2 | 9/2007 | van Enk | |
| 7,290,549 B2 | 11/2007 | Banerjee et al. | |
| 7,296,299 B2 | 11/2007 | Schwenck et al. | |
| 7,362,248 B2 | 4/2008 | McClure et al. | |
| 7,385,491 B2 | 6/2008 | Doi | |
| 7,436,316 B2 | 10/2008 | Fleischman et al. | |
| 7,443,176 B2 | 10/2008 | McClure et al. | |
| 7,488,954 B2 | 2/2009 | Ross et al. | |
| 7,518,507 B2 | 4/2009 | Dalzell et al. | |
| 7,573,301 B2 | 8/2009 | Walmsley | |
| 7,666,813 B2 | 2/2010 | Hoefer et al. | |
| 7,806,072 B2 | 10/2010 | Hamilton, II et al. | |
| 7,816,785 B2 | 10/2010 | Iruvanti et al. | |
| 7,830,021 B1 | 11/2010 | Wilcoxon et al. | |
| 7,834,442 B2 | 11/2010 | Furman et al. | |
| 7,886,813 B2 | 2/2011 | Hua et al. | |
| 7,894,442 B2 | 2/2011 | Li | |
| 7,952,478 B2 | 5/2011 | Bartley et al. | |
| 8,137,597 B1 * | 3/2012 | Brott | F21K 2/06 252/700 |
| 8,174,112 B1 | 5/2012 | Karp et al. | |
| 8,198,641 B2 | 6/2012 | Zachariasse | |
| 8,288,857 B2 | 10/2012 | Das et al. | |
| 8,310,147 B2 | 11/2012 | Seo et al. | |
| 8,502,396 B2 | 8/2013 | Buer et al. | |
| 8,522,049 B1 | 8/2013 | Ahmadi | |
| 8,581,209 B2 | 11/2013 | Oxley et al. | |
| 8,623,418 B2 | 1/2014 | Liang et al. | |
| 8,659,908 B2 | 2/2014 | Adams et al. | |
| 8,741,084 B2 | 6/2014 | Kisch et al. | |
| 8,741,804 B2 | 6/2014 | Boday et al. | |
| 8,824,040 B1 | 9/2014 | Buchheit et al. | |
| 8,865,285 B2 | 10/2014 | Dagher et al. | |
| 8,896,100 B2 | 11/2014 | Kishino et al. | |
| 8,896,110 B2 | 11/2014 | Hu et al. | |
| 9,040,252 B2 | 5/2015 | Della Ciana et al. | |
| 9,075,018 B2 | 7/2015 | Geddes et al. | |
| 9,217,736 B2 | 12/2015 | Ribi | |
| 9,245,202 B2 | 1/2016 | Boday et al. | |
| 9,263,605 B1 | 2/2016 | Morgan et al. | |
| 9,307,692 B2 | 4/2016 | Boday et al. | |
| 9,856,404 B2 | 1/2018 | Campbell et al. | |
| 9,858,780 B1 | 1/2018 | Campbell et al. | |
| 9,896,389 B2 | 2/2018 | Campbell et al. | |
| 10,040,993 B1 | 8/2018 | Brott et al. | |
| 10,229,292 B2 | 3/2019 | Campbell et al. | |
| 10,331,911 B2 | 6/2019 | Kuczynski et al. | |
| 10,357,921 B2 | 7/2019 | Campbell et al. | |
| 10,392,452 B2 | 8/2019 | Campbell et al. | |
| 2005/0068760 A1 | 3/2005 | Goychrach | |
| 2006/0079021 A1 | 4/2006 | Yang | |
| 2006/0228542 A1 | 10/2006 | Czubarow | |
| 2007/0054762 A1 | 3/2007 | Tocco | |
| 2007/0207284 A1 | 9/2007 | McClintic | |
| 2008/0038540 A1 | 2/2008 | Hirayama et al. | |
| 2008/0090942 A1 | 4/2008 | Hovorka | |
| 2008/0277596 A1 | 11/2008 | Oxley | |
| 2008/0286856 A1 | 11/2008 | Park et al. | |
| 2009/0036568 A1 * | 2/2009 | Merle | B01J 13/18 523/206 |
| 2010/0006431 A1 | 1/2010 | Wallace et al. | |
| 2012/0007249 A1 | 1/2012 | Kuo et al. | |
| 2012/0077279 A1 | 3/2012 | Wiesner et al. | |
| 2013/0034739 A1 | 2/2013 | Boday et al. | |
| 2013/0179996 A1 | 7/2013 | Boday et al. | |
| 2014/0011049 A1 | 1/2014 | Stamm | |
| 2014/0110049 A1 | 4/2014 | Yuen et al. | |
| 2014/0368992 A1 | 12/2014 | Strader et al. | |
| 2015/0166822 A1 | 6/2015 | Samsudin et al. | |
| 2015/0246521 A1 | 9/2015 | Fathi et al. | |
| 2015/0364710 A1 | 12/2015 | Chen et al. | |
| 2016/0033497 A1 | 2/2016 | Wang et al. | |
| 2016/0053169 A1 | 2/2016 | Kunath et al. | |
| 2016/0067524 A1 | 3/2016 | Bourke, Jr. | |
| 2016/0289484 A1 | 10/2016 | Lalgudi et al. | |
| 2017/0015886 A1 | 1/2017 | Braun et al. | |
| 2017/0027197 A1 | 2/2017 | Bourke, Jr. et al. | |
| 2017/0029532 A1 | 2/2017 | Pandya | |
| 2017/0129825 A1 * | 5/2017 | Campbell | C06B 45/32 |
| 2017/0130102 A1 | 5/2017 | Campbell | |
| 2017/0130993 A1 | 5/2017 | Campbell et al. | |
| 2017/0158886 A1 | 6/2017 | Odarczenko | |
| 2017/0279532 A1 | 9/2017 | Bartley et al. | |
| 2018/0116060 A1 | 4/2018 | Campbell et al. | |
| 2018/0327659 A1 | 11/2018 | Campbell et al. | |
| 2018/0340032 A1 * | 11/2018 | Campbell | C08G 59/188 |
| 2018/0340850 A1 | 11/2018 | Campbell et al. | |
| 2018/0371122 A1 | 12/2018 | Campbell et al. | |
| 2018/0371123 A1 | 12/2018 | Campbell et al. | |

FOREIGN PATENT DOCUMENTS

| | | |
|---|---|---|
| CN | 103740997 A | 4/2014 |
| JP | 2000317578 A | 11/2000 |
| JP | 2001176924 A | 6/2001 |
| JP | 4073571 B2 | 4/2008 |
| WO | 9733922 A1 | 9/1997 |
| WO | 2009029804 A2 | 3/2009 |
| WO | 2011086018 A1 | 7/2011 |
| WO | 2014024828 A1 | 2/2014 |
| WO | 201618336 A1 | 2/2016 |

OTHER PUBLICATIONS

Kreft et al, Shell-in-Shell Microcapsules: A Novel Tool for Integrated, Spatially Confined Enzymatic Reactions, Angew. Chem. Int. Ed. 2007, 46, 5605-5608 (Year: 2007).*

Hu et al., Controlled Rupture of Magnetic Polyelectrolyte Microcapsules for Drug Delivery, Langmuir 2008, 24, 11811-11818 (Year: 2008).*

M. Yamaura et al., "Preparation and characterization of (3-aminopropyl) triethoxysilane-coated magnetite nanoparticles," Journal of Magnetism and Magnetic Materials 2004, vol. 279, pp. 210-217.

O. Kreft et al., "Shell-in-Shell Microcapsules: A Novel Tool for Integrated, Spatially Confined Enzymatic Reactions", Angewandte Chemie International Edition 2007, vol. 46, Iss. 29, pp. 5605-5608.

E. J. Campbell et al., "Heat-Generating Multi-Compartment Microcapsules," U.S. Appl. No. 14/937,983, filed Nov. 11, 2015.

R. Xiong et al., "Towards Theranostic Multicompartment Microcapsules: In Situ Diagnostics and Laser-Induced Treatment," Theranostics 2013, vol. 3, Iss. 3, pp. 141-151.

B. V. Parakhonskiy, "Colloidal micro- and nano-particles as templates for polyelectrolyte multilayer capsules," Advances in Colloid and Interface Science 2014, 207, pp. 253-264.

Yamaura et al., Preparation and characterization of (3-aminopropyl) triethoxysilane-coated magnetite nanoparticles, Journal of Magnetism and Magnetic Materials, vol. 279, Issues 2-3, Aug. 2004, pp. 210-217, ScienceDirect.com (online), Elsevier B.V., Amsterdam.

(56) References Cited

OTHER PUBLICATIONS

Jorgensen et al., A Biochemical Microdevice With an Integrated Chemiluminescence Detector, Sensors and Actuators B: Chemical, vol. 90, Issue 1, Apr. 2003, pp. 15-21, Elsevier, Amsterdam, Netherlands. [Abstract Only].
Previte et al., Microwave-Triggered Metal-Enhanced Chemiluminescence (MT-MEC): Application to Ultra-Fast and Ultra-Sensitive Clinical Assays, Journal of Fluorescence, vol. 16, Issue 5, Sep. 2006, pp. 641-647, Springer Science+Business Media, Berlin,Germany.
Marzzacco, The Effect of a Change in the Catalyst on the Enthalpy of Decomposition of Hydrogen Peroxide, pp. 12-13, Chem 13 News, Nov. 2008, reprinted from pp. 16-17, May 2001, University of Waterloo, Waterloo, ON, Canada.
Masin, The Chemistry of Hand Warmers, 3 pages, chemistryislife.com (online), accessed Jun. 5, 2017, URL: www.chemistryislife.com/the-chemistry-of-hand-warmer.
Unknown, Flameless Chemical Heaters, zenstoves.net (online), 4 pages, accessed Jun. 5, 2017, URL: http://zenstoves.net/Flameless.htm.
Kawashita et al., In vitro heat generation by ferrimagnetic maghemite microspheres for hyperthermic treatment of cancer under alternating magnetic field, Journal of Materials Science: Materials in Medicine, vol. 19, Issue 5, pp. 1897-1903, May 2008,(Abstract Only, 2 pages), URL:www.ncbi.nlm.nih.gov/pubmed/17914614. [Abstract Only].
Engineering ToolBox, (2003). Specific Heat of some common Substances. [online] Available at: https://www.engineeringtoolbox.com/specific-heat-capacity-d_391.html [Accessed Jan. 9, 20200].
Unknown, Standard enthalpy change of formation (data table), Wikipedia.org (online), 13 pages, accessed Jun. 5, 2017, URL: en.wikipedia.org/wiki/Standard_enthalpy_change_of_formation_%28data_table—%29.
Unknown, Technical Overview: Microencapsulation, microteklabs.com (online), 4 pages, accessed Jun. 5, 2017, URL: www.microteklabs.com/technical_overview.pdf.
Unknown, Thermochemistry, 7 pages, Olomouc—Hej{hacek over (c)}in Gymnasium (online), 7 pages, accessed Jun. 5, 2017, URL:http://smd.gytool.cz/downloads/thermochemistry_bar.pdf.
Delcea et al., Multicompartmental Micro—and Nanocapsules: Hierarchy and Applications in Biosciences, Macromolecular Bioscience, vol. 10, May 2010, pp. 465-474, Wiley-VCH Verlag GmbH & Co., Weinheim. [Abstract only].
Lee, Microencapsulated Heat Generating Material to Accelerate the Curing Process During Liquid Crystal Display Fabrication, NineSigma, Inc. (online), 2014 (month unknown), 3 pages, accessed Jun. 5, 2017, URL:https://ninesights.ninesigma.com/rfps/-/rfp-portlet/rfpViewer/2690.
Brown et al., In situ poly(urea-formaldehyde) microencapsulation of dicyclopentadiene, Journal of Microencapsulation, Nov.-Dec. 2003, vol. 20, No. 6, pp. 719-730, Taylor & Francis Ltd (online, www.tandf.co.uk/journals), DOI:10.1080/0265204031000154160.
Keller et al., Mechanical Properties of Microcapsules Used in a Self-Healing Polymer, Experimental Mechanics, vol. 46, Nov. 2006, pp. 725-733, Society for Experimental Mechanics, Bethel, CT. [Abstract Only].
Caruso et al. "Robust, Double-Walled Microcapsules for Self-Healing Polymeric Materials," ACS Applied Materials & Interfaces, 2010, vol. 2, No. 4, pp. 1195-1199.
Unknown, Materials for Sealing Liquid Crystal, Three Bond Technical News, vol. 43, May 1994, pp. 1-8, Three Bond Europe, UK.
Unknown, Advanced Technologies for LCD Assembly, DowCorning.com (online), 2014 (month unknown), 4 pages, accessed Jun. 5, 2017, URL: www.dowcorning.com/content/publishedlit/11-3437_Advanced_Technologies_LCD-_Assembly.pdf?wt.svl=ELEC_LHH.
Unknown, Loctite Eccobond DS 6601, Henkel.com (online), Mar. 2013, 2 pages, URL: https://tds.us.henkel.com/NA/UT/HNAUTTDS.nsf/web/C0DD8377AB27D63985257B41-005DC4A1/$File/LOCTITE%20ECCOBOND%20DS%206601-EN.pdf.
Stober et al., Controlled Growth of Monodisperse Silica Spheres in the Micron Size Range, Journal of Colloid and Interface Science, vol. 26, Jan. 1968, pp. 62-69, Elsevier Inc., Amsterdam. [Abstract Only].
Parakhonskiy, Colloidal micro- and nano-particles as templates for polyelectrolyte multilayer capsules, Advances in Colloid and Interface Science, May 2014, vol. 207, pp. 253-264, ScienceDirect.com (online), Elsevier B.V., Amsterdam. [Abstract Only].
Park et al., Smart Microplates: Integrated Photodiodes for Detecting Bead-Based Chemiluminescent Reactions, 5.sup. th IEEE Conference on Sensors, EXCO, (IEEE Sensors 2006), held Oct. 2006, Daegu, Korea, pp. 580-583, Institute of Electrical and Electronics Engineers (IEEE), DOI: 10.1109/ICSENS.2007.355534, USA. [Abstract Only].
Zhan et al., Electrochemical Sensing in Microfluidic Systems Using Electrogenerated Chemiluminescence as a Photonic Reporter of Redox Reactions, JACS Articles, vol. 124, No. 44, Oct. 2002, pp. 13265-13270, American Chemical Society, Washington, D.C.

* cited by examiner

LIGHT EMITTING SHELL IN MULTI-COMPARTMENT MICROCAPSULES

FIELD OF THE DISCLOSURE

The disclosure herein relates in general to the field of materials science, and more specifically, to multi-compartment microcapsules that produce light when subjected to a stimulus.

BACKGROUND

Chemiluminescence is the emission of photons as the result of a chemical reaction. Various chemiluminescence reactions are known, including those used in glow sticks and the luminol reaction. It would be useful to be able to use chemiluminescence to indicate and detect when an event, such as an unwanted intrusion, happens.

SUMMARY

Embodiments described herein relate to materials and methods of making multi-compartment capsules that produce photons when subjected to a stimulus.

According to an embodiment, a multi-compartment microcapsule is provided. The multi-compartment microcapsule comprises: a first compartment; a second compartment; an isolating structure separating first and second compartments from each other and adapted to rupture in response to a stimulus, and wherein the first and second compartments contain reactants that come in contact and react to produce photons as a product of chemiluminescence when the isolating structure ruptures.

In another embodiment, a method of making a multi-compartment microcapsule is provided. The method includes preparing a microparticle containing a first reactant immobilized in a first sacrificial colloidal template; coating a first polymer on a surface of the microparticle to form a polymer-coated microparticle; preparing a ball-in-ball microparticle containing a second reactant immobilized in a second sacrificial colloidal template, wherein the ball-in-ball microcapsule incorporates the polymer-coated microparticle; coating a second polymer on a surface of the ball-in-ball microparticle to form a polymer-coated ball-in-ball microparticle; extracting the first and second colloidal templates from the polymer-coated ball-in-ball microparticle to form a shell-in-shell microcapsule having an inner shell and an outer shell, wherein the inner shell comprises the first polymer and contains the first reactant, wherein the outer shell corresponds to the second polymer and contains the second reactant, and wherein the first and second reactants are capable of reacting together to produce photons.

In another embodiment, a method of making a multi-compartment microcapsule is provided. The method includes preparing a microparticle containing a first reactant immobilized in a first sacrificial colloidal template; coating a first polymer on a surface of the microparticle to form a polymer-coated microparticle; preparing a ball-in-ball microparticle containing a second reactant immobilized in a second sacrificial colloidal template, wherein the ball-in-ball microcapsule incorporates the polymer-coated microparticle; coating a second polymer on a surface of the ball-in-ball microparticle to form a polymer-coated ball-in-ball microparticle, wherein the second polymer has a transmittance of at least 90%; extracting the first and second colloidal templates from the polymer-coated ball-in-ball microparticle to form a shell-in-shell microcapsule having an inner shell and an outer shell, wherein the inner shell corresponds to the first polymer and contains the first reactant, the outer shell corresponds to the second polymer and contains the second reactant, the first and second reactants are capable of reacting to produce photons and the outer shell is configured to withstand a compressive force that ruptures the inner shell.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1A:
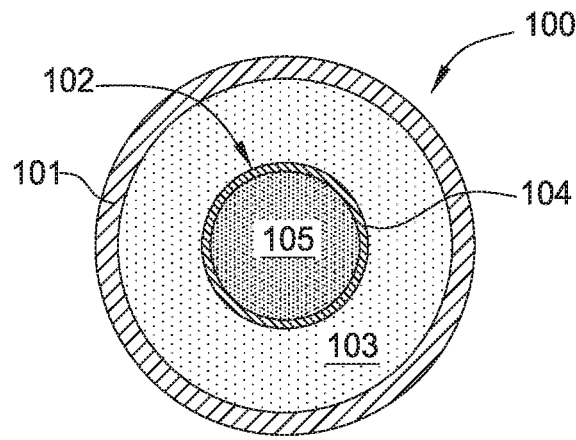
FIG. 1A depicts a multi-compartment microcapsule having a shell-in-shell architecture with an inner shell contained within an outer shell, wherein the inner shell is adapted to rupture in response to a compressive force according to some embodiments.

A photon-generating multi-compartment microcapsule includes two or more compartments containing reactants that come in contact and react to produce photons when an isolating structure ruptures in response to a stimulus. Aspects of the disclosure include a photon-generating multi-compartment microcapsule and a method of producing a photon-generating multi-compartment microcapsule. Multiple examples are shown that would be capable of producing light in a wide spectrum range.

Benefits that may be achieved by inclusion of multi-compartment microcapsules for photon generation include light being emitted in situ without the need for an external source. This is useful for self-healing and curing in adhesives or polymers containing microcapsules, and for cryptographic applications wherein an enclosure breach ruptures the microcapsules and the emitted photon are captured and trigger an appropriate response. Further, the microcapsules can be incorporated into other materials (polymers, adhesives, thermal interface materials) to emit light where light from an external source may not be able to reach such as under a component or heatsink.

As used herein, the term "microcapsule" and "microparticle" is used to refer to capsules and particles that are in a range of about 10 microns to 1000 microns in diameter. However, it will be appreciated that the following disclosure may be applied to capsules having a smaller size (also referred to as "nanocapsules" or "nanoparticles").

The multi-compartment microcapsules produce photons when subjected to a stimulus (e.g., a compressive force, a magnetic field, ultrasound, or combinations thereof). In some embodiments, the multi-compartment microcapsules have first and second compartments separated by an isolating structure adapted to rupture in response to the stimulus, wherein the first and second compartments contain reactants that come in contact and react to produce photons when the isolating structure ruptures. In some embodiments, the multi-compartment microcapsules are shell-in-shell microcapsules each having an inner shell contained within an outer shell, wherein the inner shell defines the isolating structure and the outer shell does not allow the photon-generating chemistry to escape the microcapsule upon rupture of the inner shell.

Multi-compartment microcapsules are known in the art to be formed in a variety of structural configurations (e.g., concentric, pericentric, innercentric, or acentric). Multi-compartment microcapsules include at least two compartments that are separated from each other. The compartments within a multi-compartment microcapsule may contain various chemical elements or compounds. Multi-compartment microcapsules may be produced using techniques well known to those skilled in the art.

In the embodiments that follow, exemplary non-limiting chemiluminescent reactions are shown. These exemplary chemiluminescent reactants and reactions may be used in the light emitting shell in shell microcapsules described herein. These exemplary chemiluminescent reactions are set forth for purposes of illustration, not limitation. One skilled in the art will appreciate that a reaction consistent with the spirit of the present disclosure may be used in other contexts. While chemiluminescence is the emission of photons as the result of a chemical reaction, there may also be limited emission of heat.

In accordance with some embodiments of the present disclosure, a photon-emitting microcapsule may utilize a multi-compartment microcapsule containing an oxidant, which may be hydrogen peroxide ($H_2O_2$), or any other suitable oxidant, and luminol ($C_8H_7N_3O_2$) to produce a photon-emitting reaction according to the general reaction equation:

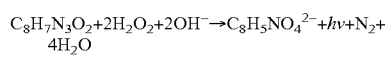

$$C_8H_7N_3O_2 + 2H_2O_2 + 2OH^- \rightarrow C_8H_5NO_4^{2-} + h\nu + N_2 + 4H_2O$$

where "hv" is the standard notation referring to release of radiant energy other than heat during the reaction. Iron or a periodate may be used to catalyze the decomposition of $H_2O_2$ so as to enhance the reaction rate of the oxidation of luminol by $H_2O_2$.

The reaction produces an intermediate, 3-aminophthalate ($C_8H_5NO_4^{2-}$) in an excited state, which then falls to a ground state and emits photons. Iron (II) and Copper (II) catalysts are common catalysts used for the reaction. Suitable catalysts that may accelerate the reaction include compounds such as copper-, iron-, or periodate-compounds, such as potassium ferricyanide, potassium periodate, and copper sulfate. Suitable oxidants include peroxides such as hydrogen peroxide ($H_2O_2$), sodium hypochlorite, n-butyl hydroperoxide, t-butyl hydroperoxide, 3-chlorobenzoic acid, and dibenzoyl peroxide; solid sources of hydrogen peroxide such as sodium perborate, sodium percarbonate, and urea peroxide; hypohalites such as N-bromosuccinimide, 1,3-dibromo-5,5-dimethylhydantoin. Although luminol is shown in this example, isoluminol may also be used. Suitable solvent systems include aprotic solvent systems and aqueous systems. The photons emitted for this reaction can vary due to solvents and reagents. For example, oxidation in aprotic solvents gives rise to yellow-green emission, while in aqueous systems this shifts to blue emission.

Another example of a chemiluminescent reaction that may be used in multi-compartment microcapsules is the reaction of a suitable dye with diphenyl oxalate (also known as cyalume; $C_{14}H_{10}O_4$) and a suitable oxidant such as hydrogen peroxide to produce a photon-emitting reaction according to the general reaction equation:

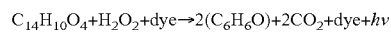

$$C_{14}H_{10}O_4 + H_2O_2 + dye \rightarrow 2(C_6H_6O) + 2CO_2 + dye + h\nu$$

If hydrogen peroxide is used as the oxidant, the reaction produces phenol ($C_6H_6O$) and an intermediate 1,2-dioxetanedione (not shown). 1,2-dioxetanedione, having an unstable strained ring, decomposes to carbon dioxide and releases energy that excites the dye. The dye then releases a photon as it returns to its ground state.

The wavelength of the photon released depends on the structure of the dye, and the dyes can be selected according to the desired application and color. For example, the following dyes may be used: tetracene (yellow-green); 1-chloro-9,10-bis(phenylethynyl)anthracene (yellow); 9,10-diphenylanthracene (blue); 9,10-bis(phenylethynyl)anthracene (green); 5,12-bis(phenylethynyl)naphthacene (orange); and [9-(2-carboxyphenyl)-6-diethylamino-3-xanthenylidene]-diethylammonium chloride ("Rhodamine B"; red). Dyes can also be mixed to produce various other colors. Chemiluminescent emissions are not limited to visible light; infrared chemiluminescent emissions can also be accomplished. Examples of dyes releasing infrared light include violanthrone-79.

Instead of diphenyl oxalate, other oxalates and peroxyoxalates can be used including bis(2,4,6-trichlorophenyl) oxalate (TCPO), Bis[3,4,6-trichloro-2-(pentyloxycarbonyl) phenyl] oxalate (CPPO), bis(2,4-dinitrophenyl) oxalate, and divanillyl oxalate. Other peroxyoxalates and oxalic acid derivatives, such as sulfonamides, can be used.

One skilled in the art will appreciate that other oxidants may be used. Suitable oxidants include peroxides (including, $H_2O_2$, n-butyl hydroperoxide, t-butyl hydroperoxide, 3-chlorobenzoic acid, and dibenzoyl peroxide), solid sources of hydrogen peroxide (including sodium perborate, sodium percarbonate, and urea peroxide), hypohalites (i.e., N-bromosuccinimide, 1,3-dibromo-5,5-dimethylhydantoin), and sodium hypochlorite.

Solvents for the oxalate and oxalate derivative chemiluminescent reactions include aqueous solutions, polar aprotic solvents, such as dialkyl phthalates (including dioctyl phthalate, dimethyl phthalate) and ethylene glycol dimethyl ether, and solvent mixtures of dialkyl phthalates and some alcohols (i.e., tert-butanol).

Another example of a chemiluminescent reaction that may be used in multi-compartment microcapsules is the reaction of acridinium ester salts (1; where $R^1$ is a leaving group having a $pK_a<11$) with basic hydrogen peroxide.

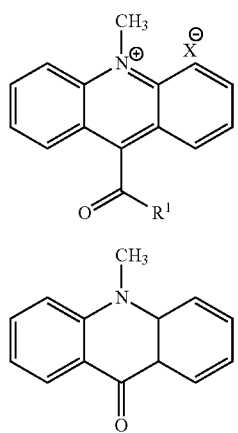

Upon reaction with hydrogen peroxide, the acridinium ester decomposes to carbon dioxide, the conjugate acid of the leaving group ($R^1$—H), and an excited state of compound 2. The excited state of compound 2 then releases a photon as it returns to its ground state. The efficiency of the photons generated is related to the $pK_a$ of the conjugate acid of the leaving group. Examples of $R^1$ include the conjugate base of phenolate, and the conjugate base of substituted phenolates with electron withdrawing groups and electron donating groups. Other acridine compounds can be used including acridine-9-carbonylimidazole, acridine compounds with sulfonamide leaving groups, and acridine compounds with hydroxamic acid leaving groups. Solvent systems suitable for acridinium salts include aqueous solutions.

One skilled in the art will appreciate that other chemiluminescent reactions are available for use in the multi-compartment microcapsules described herein. The chemical reactions and reactants may be chosen according to its application. For example, dyes and other chemicals may be chosen based on the color of the light produced, intensity of light, wavelength of light, and time profile.

Photon-generating microcapsules can be used in many applications, including adhesives, tamper detection security schemes, and perimeter control. For example, in tamper detection applications, microcapsules are incorporated into a security layer and if the device is tampered with, the microcapsules rupture. The photons produced upon rupture are detected by a device and sends a signal that the device is being tampered with.

FIG. 1A depicts a multi-compartment microcapsule 100 having a shell-in-shell architecture with an inner shell contained within an outer shell, wherein the inner shell is adapted to rupture in response to a compressive force according to some embodiments of the present disclosure. In FIG. 1A, the multi-compartment microcapsule 100 is illustrated in a cutaway view. The multi-compartment microcapsule 100 has an outer wall 101 (also referred to herein as the "outer shell" 101 of the multi-compartment microcapsule 100) and contains an inner microcapsule 102 and a first reactant 103. The inner microcapsule 102 has a capsule wall 104 (also referred to herein as the "inner shell" 104 of the multi-compartment microcapsule 100) and contains a second reactant 105. The first reactant 103 within the multi-compartment microcapsule 100 may surround the inner microcapsule 102, and the first reactant 103 may be prevented from contacting the second reactant 105 by the capsule wall 104 of the inner microcapsule 102.

The capsule wall 104 of the inner microcapsule 102 may be formed to rupture under a particular compressive force and the outer wall 101 of the microcapsule 100 may be formed so as to not rupture under that compressive force. Rupturing the capsule wall 104 of the inner microcapsule 102 may allow the second reactant 105 to contact the first reactant 103 and the reactants may then chemically or physically react to produce radiant energy (i.e., photons).

Figure 1B:
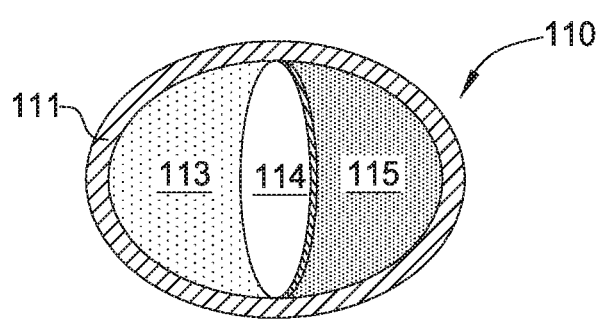
FIG. 1B depicts a multi-compartment microcapsule having an inner barrier to form compartments, wherein the inner barrier is adapted to rupture in response to a compressive force according to some embodiments.

FIG. 1B depicts a multi-compartment microcapsule 110 having an inner barrier that defines compartments, wherein the inner barrier is adapted to rupture in response to a compressive force according to some embodiments of the present disclosure. In FIG. 1B, the multi-compartment microcapsule 110 is illustrated in a cutaway view. The multi-compartment microcapsule 110 has an outer wall 111 and contains a first reactant 113 and a second reactant 115. An inner barrier 114, which may be a membrane, within the multi-compartment microcapsule 110 may prevent the first reactant 113 and the second reactant 115 from coming into contact. The inner barrier 114 may be any form of a physical barrier that forms two or more compartments within the microcapsule 110.

Multi-compartment microcapsule 110 may be made using a method of partially shielding a lower part of the particles/capsules incorporated in soft films. Under this approach, particles or capsules are sedimented onto the films leaving the upper part non-protected. In the subsequent step, (typically) smaller particles/capsules are adsorbed onto the non-protected part of embedded particles. Extraction of the embedded particles is done by turning the films upside-down and adding a solvent (sodium hydroxide of higher pH for hyaluronic acid/poly-L-lysine films). The solvent loosens the interaction between the films and capsules/particles, thus allowing the latter to detach and be collected.

The inner barrier 114 may be formed to rupture under a particular compressive force and the outer wall 111 of the multi-compartment microcapsule 110 may be formed so as to not rupture under that compressive force. Rupturing the inner barrier 114 may allow the first reactant 113 to contact the second reactant 115 and the reactants may then chemically or physically react.

In accordance with some embodiments, the compressive force applied to a photon-emitting microcapsule may be within the range typical of that applied in the manufacture of adhesive, polymer, or thermal interface materials. The compressive force applied to a photon-emitting microcapsule may be tailored to other applications, including that for a tamper detection security scheme. In accordance with some embodiments, the inner capsule wall 104 (of the multi-compartment microcapsule 100 shown in FIG. 1A), or an inner barrier 114 (of the multi-compartment microcapsule 110 shown in FIG. 1B), may rupture at a force no greater than the lower bound of this range of compressive force. The outer wall 101 (of the multi-compartment microcapsule 100 shown in FIG. 1A), or the outer wall 111 (of the multi-compartment microcapsule 110 shown in FIG. 1B), may sustain, without rupturing, a force no less than the upper bound of this range of compressive force.

Other embodiments may utilize more than two reactants. The multi-compartment microcapsule 100 of FIG. 1A may contain a plurality of inner microcapsules, such as 102, and the inner microcapsules may themselves contain other, inner, microcapsules and/or reactants. The various microcapsules may contain reactants and may rupture under compression to allow the reactants to come into contact. Similarly, the multi-compartment microcapsule 110 of FIG. 1B may contain a plurality of compartments formed by a plurality of membranes or barriers, such as 114, and the compartments may in turn contain one or more membranes or barriers, or may contain microcapsules. The inner shells and outer shells may contain multiple chemicals, compounds, particles, and the like. The various membranes or barriers may rupture under compression to allow the reactants to come into contact.

Figure 1C:
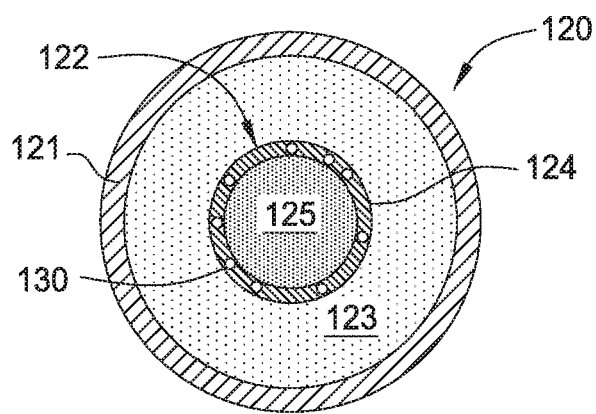
FIG. 1C depicts a multi-compartment microcapsule having a shell-in-shell architecture with an inner shell contained within an outer shell, wherein the inner shell is adapted to rupture in a magnetic field according to some embodiments.

FIG. 1C depicts a multi-compartment microcapsule 120 having a shell-in-shell architecture with an inner shell contained within an outer shell, wherein the inner shell is adapted to rupture in a magnetic field according to some embodiments of the present disclosure. In FIG. 1C, the multi-compartment microcapsule 120 is illustrated in a cutaway view. The multi-compartment microcapsule 120 depicted in FIG. 1C is similar to the multi-compartment microcapsule 100 depicted in FIG. 1A, but one or more magnetic nanoparticles 130 are incorporated into the inner shell of the multi-compartment microcapsule 120. The magnetic nanoparticles used herein are ferromagnetic. In order to rupture the inner shell, the ferromagnetic nanoparticles are forced to rotate through the shell under an applied magnetic field. The multi-compartment microcapsule 120 has an outer wall 121 (also referred to herein as the "outer shell" 121 of the multi-compartment microcapsule 120) and contains an inner microcapsule 122 and a first reactant 123. The inner microcapsule 122 has a capsule wall 124 (also referred to herein as the "inner shell" 124 of the multi-compartment microcapsule 120) and contains a second reactant 125. The first reactant 123 within the multi-compartment microcapsule 120 may surround the inner microcapsule 122, and the first reactant 123 may be prevented from contacting the second reactant 125 by the capsule wall 124 of the inner microcapsule 122.

With regard to the multi-compartment microcapsule 120 depicted in FIG. 1C, in accordance with some embodiments of the present disclosure, a magnetic field generating device generates a magnetic field sufficient to rupture the "inner shell" 124 of the multi-compartment microcapsules 120 through magnetic stimulation of the magnetic nanoparticles 130. Application of a sufficiently strong high frequency magnetic field causes the magnetic nanoparticles 130 embedded in the "inner shell" 124 of the multi-compartment microcapsules 120 to rotate and/or vibrate at a high-energy combination of amplitude and frequency that ruptures the "inner shell" 124 and, in turn, permits the first reactant 123 and the second reactant 125 to contact one another, react, and generate photons. Preferably, the high frequency magnetic field applied to the photon-emitting microcapsule by the magnetic field generating device has a frequency of approximately 50-100 kHz and strength of approximately 2.5 kA/m or 31 Oe. It is contemplated that the magnetic field may be stronger.

The capsule wall 124 of the inner microcapsule 122 may be formed with one or more magnetic nanoparticles 130 to rupture under a particular magnetic field through magnetic stimulation of the one or more magnetic nanoparticles 130 and the outer wall 121 of the microcapsule 120 may be formed so as to not rupture under that magnetic field. Rupturing the capsule wall 124 of the inner microcapsule 122 may allow the second reactant 125 to contact the first reactant 123 and the reactants may then chemically or physically react.

Figure 2A:
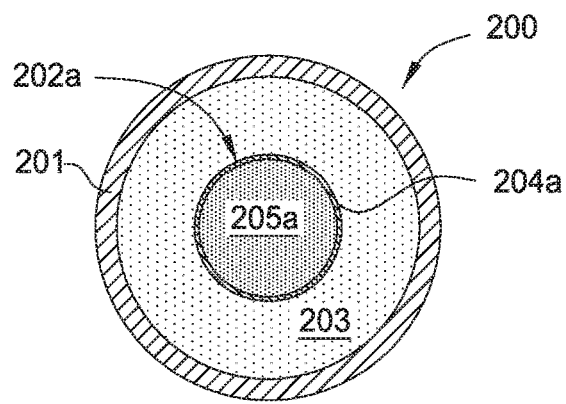
FIG. 2A illustrates a multi-compartment microcapsule containing reactants according to some embodiments.
Figure 2B:
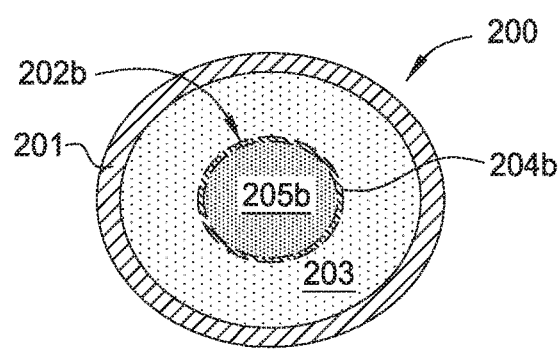
FIG. 2B illustrates a multi-compartment microcapsule in which the capsule wall of the inner microcapsule is ruptured according to some embodiments.
Figure 2C:
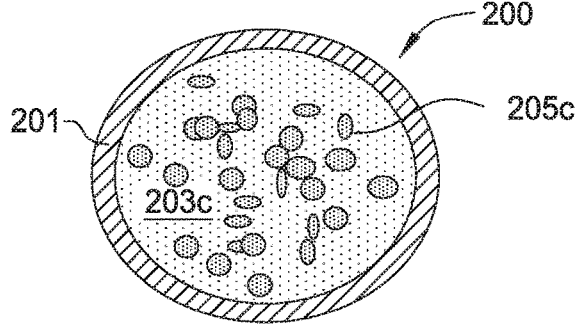
FIG. 2C illustrates a multi-compartment microcapsule in which a first reactant is dispersed within a second reactant according to some embodiments.
Figure 2D:
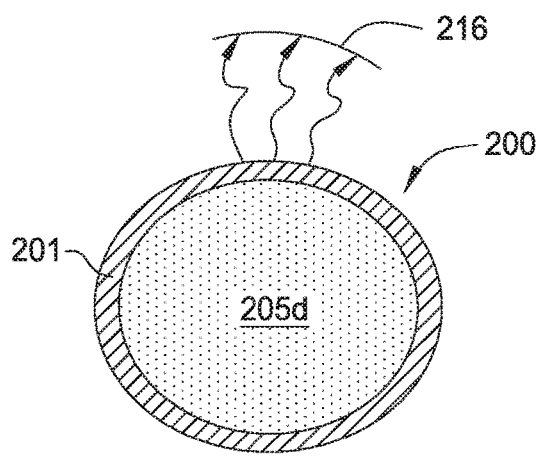
FIG. 2D illustrates a multi-compartment microcapsule in which the reactants within the microcapsule have generated photons according to some embodiments of the present disclosure.
Figure 3:
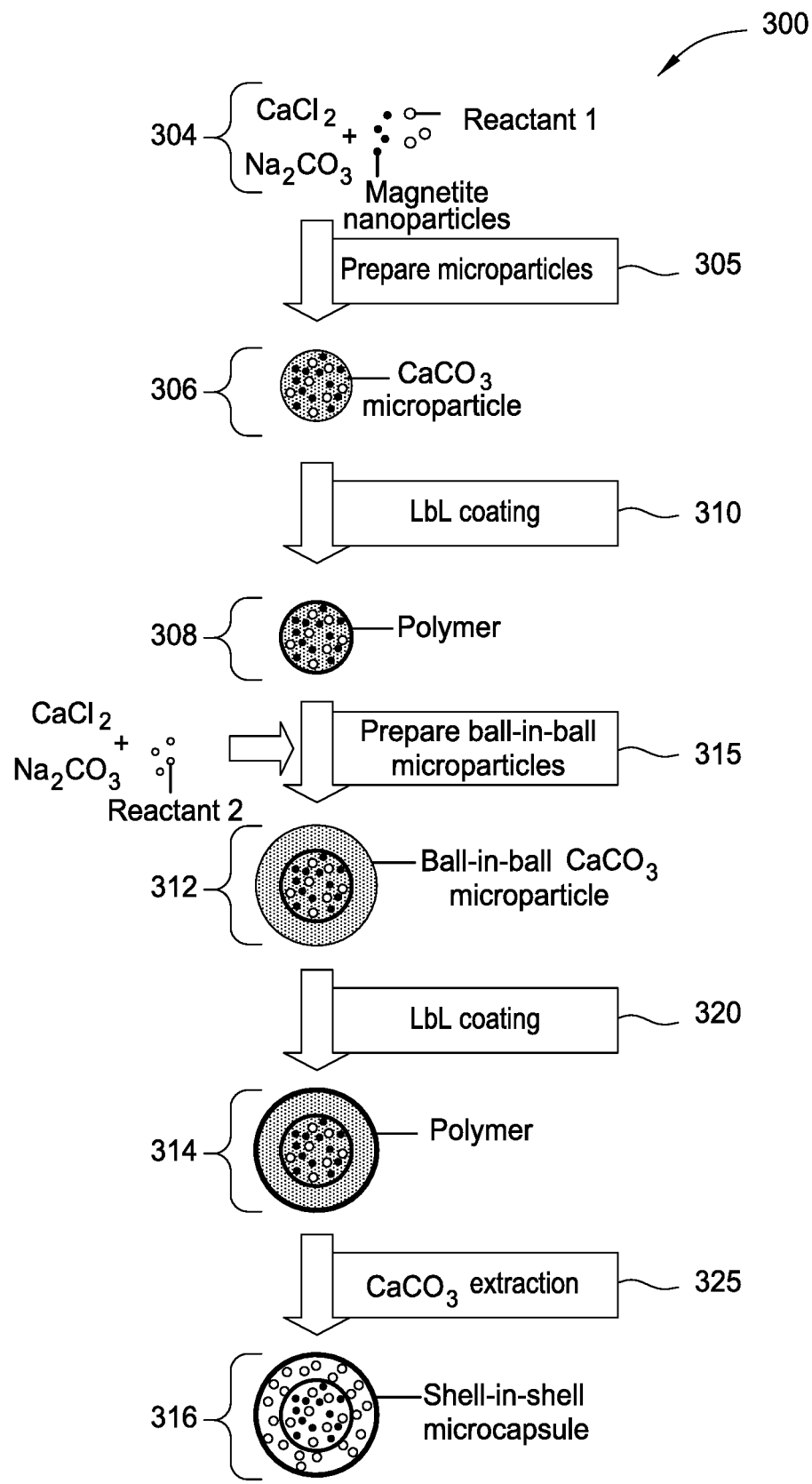
FIG. 3 is a flow diagram illustrating a method of producing a multi-compartment microcapsule having a shell-in-shell architecture with an inner shell contained within an outer shell, wherein the inner shell is adapted to rupture in response to a compressive force and/or a magnetic field according to some embodiments.

While the description of FIGS. 1-3 describes stimuli as compressive force and magnetic force, it should be understood that other stimuli may be used to rupture the inner shell. Other stimuli include heat and ultrasound. If heat is used, the capsule wall of the inner microcapsule may be formed with one or more heat-sensitive polymers to rupture under a particular temperature, and the outer wall of the microcapsule may be formed so as to not rupture under that temperature. Rupturing the capsule wall of the inner microcapsule may allow the second reactant to contact the first reactant and the reactants may then chemically or physically react.

For aqueous systems, heat-sensitive polymers for the capsule wall of the inner microcapsule can be a made of a polymeric material that has a melting point in the desired temperature ranges compatible with aqueous systems. For such applications, the outer shell should be thermally stable at the desired temperature range. The polymer of the capsule wall of the inner microcapsule may be polyamides, polyimides, polyesters, urea-formaldehydes, among others. Alternatively, the solvent inside the inner capsule can be tailored to rupture the capsule wall of the inner microcapsule at lower temperatures due to volatilization below 100° C.

For example, if it is desired for the capsule wall of the inner microcapsule to rupture at a temperature of about 60° C. to about 80° C., polymers that melt in that temperature range, such as polycaprolactone and isotactic polypropylene oxide, can be used. However, different applications may require different polymers with the appropriate melting point. The melting point of polymers can be tailored for the specific application. Another example of a capsule wall of the inner microcapsule is N-Isopropylacrylamide (NI-PAAm) which contracts upon heating to initiate thermal release because it undergoes a reversible lower critical solution temperature phase transition. The temperature at which the phase transition occurs can be altered by tailoring the polymer structure. NIPAAm microcapsule shells can also rupture from increased internal pressure upon contraction of the shell due to temperature increase.

FIG. 2A, FIG. 2B, FIG. 2C, and FIG. 2D illustrate configurations of a multi-compartment microcapsule under a compressive force, and the compression causing the reactants within the microcapsule to mix, according to some embodiments of the present disclosure. FIG. 2A illustrates a first microcapsule containing reactants and an inner microcapsule. FIG. 2B illustrates the first microcapsule of FIG. 2A in which the inner microcapsule wall is ruptured. FIG. 2C illustrates the first microcapsule of FIG. 2B in which a reactant contained in the inner microcapsule is dispersed within a reactant initially surrounding the inner microcapsule. FIG. 2D illustrates the first microcapsule of FIG. 2C in which the reactants have produced a reaction product within the first microcapsule and generated photons.

In more detail, FIG. 2A illustrates a microcapsule 200 formed to have a structure similar to that of the multi-compartment microcapsule 100 of FIG. 1A. Microcapsule 200 may have an outer wall 201 and may contain a first reactant 203 and an inner capsule 202a. The inner capsule 202a may have an outer capsule wall 204a and may contain a second reactant 205a. A compressive force may be applied to the multi-compartment microcapsule 200, which may cause the capsule wall 204a of an inner microcapsule 202a to rupture.

FIG. 2B illustrates a second configuration of microcapsule 200 in which the capsule wall 204b of the inner microcapsule 202b may rupture under compression of the microcapsule 200, indicated by the broken line of the capsule wall 204b.

FIG. 2C illustrates a third configuration of microcapsule 200 in which the second reactant 205c may become dispersed within the first reactant 203c, in response to the inner microcapsule 202b having ruptured. The dispersion of the second reactant 205c within the first reactant 203c may cause them to react.

FIG. 2D illustrates a fourth configuration of microcapsule 200 in which the reactants 203c and 205c may have come into contact and may have reacted. The fourth configuration of the microcapsule 200 may contain the product 205d of the reaction of 203c and 205c and the outer wall 201 may contain the reaction product 205d so as to prevent the reaction product from contacting a material in which microcapsule 200 may be itself dispersed. The reactants 203c and 205c may have reacted to produce photons 216, and the photons may, as illustrated in FIG. 2D, transfer from the microcapsule 200 to a material in which the microcapsule is dispersed.

With reference again to the multi-compartment microcapsule 100 of FIG. 1A, a multi-compartment microcapsule may contain a mixture of chemiluminescent reactants (i.e., luminol and a catalyst; dye and diphenyl oxalate) in the inner microcapsule 102 as the second reactant 105 and may contain hydrogen peroxide (or other oxidant or co-reactant) as the first reactant 103 surrounding the inner microcapsule 102. Alternatively, a multi-compartment microcapsule may contain hydrogen peroxide in the inner microcapsule 102 as the second reactant 105 and may contain a mixture of chemiluminescent reactants (i.e., luminol and a catalyst; or dye and diphenyl oxalate) as the first reactant 103 surrounding the inner microcapsule 102.

In some embodiments, the multi-compartment microcapsule has a particle size in the range of 0.5-200 microns. In some embodiments, a multi-compartment microcapsule may have a diameter of less than 5.0 microns, or a multi-compartment microcapsule may have a smaller diameter of less than 2.0 microns. The particle size of the multi-compartment microcapsule can be smaller or larger based on the requirements of the encapsulating or the application.

A structure similar to multi-compartment microcapsule 110 of FIG. 1B, including the various embodiments thereof, may operate similarly to the microcapsule 200 of FIG. 2A through FIG. 2D to rupture the inner barrier 114, which may be a membrane, mix the reactants 113 and 115, and produce photons from a reaction 216 of the reactants. It would be further apparent to one of ordinary skill in that art that a photon-emitting reaction may be produced by more than two reactants, and that more than two reactants within a capsule may be isolated by more than one inner capsule or inner barrier, or more than one of any other form of barrier isolating the reactants within the capsule. A variety of reactants may be substituted to produce chemiluminescent reaction, or a variety of reaction rates and total photons produced, in accordance with some embodiments of the present disclosure.

FIG. 3 is a flow diagram illustrating a method 300 of producing a multi-compartment microcapsule having a shell-in-shell architecture with an inner shell contained within an outer shell, wherein the inner shell is adapted to rupture in response to a stimuli (i.e., a compressive force and/or a magnetic field) according to some embodiments of the present disclosure. In the method 300, the operations discussed below (operations 305, 310, 315, 320, and 325) are performed. Although these operations are described in preferred particular order, it should be understood that some of the operations may occur simultaneously or at other times relative to others. Moreover, those skilled in the art will appreciate that one or more operations may be omitted.

The microparticle system described in method 300 is based on $CaCO_3$ microparticles that are hardened by formation of a polyelectrolyte multilayer around the $CaCO_3$ microparticles.

In method 300, magnetic nanoparticles are used in operation 305 for incorporation into the "inner core" $CaCO_3$ microparticles (shown at stage 306) and, optionally, in operation 310 for incorporation into the "inner shell" polyelectrolyte multilayer (i.e., the "Polymer" shown at stage 308). Magnetic nanoparticles are incorporated into the "inner core" $CaCO_3$ microparticles for the purpose of subsequently magnetically isolating the product prepared in operation 315 (i.e., ball-in-ball $CaCO_3$ microparticles) from a coproduct (i.e., single core $CaCO_3$ microparticles). Magnetic nanoparticles are optionally incorporated into the "inner shell" polyelectrolyte multilayer for the purpose of adapting the inner shell of the shell-in-shell microcapsule to rupture in response to a magnetic field. The shell-in-shell microcapsule that results from this optional incorporation of magnetic nanoparticles into the inner shell corresponds to the multi-compartment microcapsule shown in FIG. 1C.

The magnetic nanoparticles may be, for example, $Fe_3O_4$ (also referred to as "magnetite") nanoparticles, cobalt ferrite nanoparticles, or other magnetic nanoparticles known in the art. Preferably, the magnetic nanoparticles have a diameter in the range of approximately 6-25 nm.

The magnetic nanoparticles are prepared using conventional techniques known to those skilled in the art. For example, magnetite nanoparticles may be prepared using a conventional technique known as the "coprecipitation method." An example of a conventional technique of preparing magnetite nanoparticles follows. A 5 mol/l NaOH solution is added into a mixed solution of 0.25 mol/l ferrous chloride and 0.5 mol/l ferric chloride (molar ratio 1:2) until obtaining pH 11 at room temperature. The slurry is washed repeatedly with distilled water. Then, the resulting magnetite nanoparticles are magnetically separated from the supernatant and redispersed in aqueous solution at least three times, until obtaining pH 7. A typical average diameter of the resulting magnetite nanoparticles is 12 nm. Magnetite nanoparticles are also commercially available, for example from nanoComposix, Inc. of San Diego, Calif.

In each of the stages 304, 306, 308, 312, 314, 316, the structure is shown in a cross-sectional side view. Referring to FIG. 3, and according to an embodiment, the shell-in-shell microcapsules can be made using any reactants and oxidants of any chemiluminescent reaction (Reactant 1 and Reactant 2). For example, Reactant 1, may be luminol and an optional catalyst, and Reactant 2 may be an oxidant such as hydrogen peroxide. Alternately, Reactant 1 may be a dye and diphenyl oxalate. Once the inner shell ruptures, the reactants mix and emit photons. One skilled in the art will understand that a variety of chemiluminescent reactants can be used. Both Reactant 1 and Reactant 2 may comprise one or more chemicals, particles, and combinations thereof.

The method 300 begins by preparing spherical calcium carbonate microparticles in which Reactant 1 (for example, luminol and a catalyst; or a dye and diphenyl oxalate), and magnetite nanoparticles are immobilized by coprecipitation (operation 305). For example, 1 M $CaCl_2$ (0.615 mL), 1 M $Na_2CO_3$ (0.615 mL), 1.4% (w/v) magnetite nanoparticle suspension (50 μL), Reactant 1 (0.50 mg dye and 133 mg oxalate), and deionized water (2.450 mL) may be rapidly mixed and thoroughly agitated on a magnetic stirrer for about 20 seconds at about room temperature. After the agitation, the precipitate may be separated from the supernatant by centrifugation and washed three times with water. One of the resulting $CaCO_3$ microparticles is shown at stage 306.

The diameter of the $CaCO_3$ microparticles produced with a reaction time of 20 seconds is about 4 μm to about 6 μm. Smaller $CaCO_3$ microparticles are produced if the reaction time is reduced from about 20 seconds to about several seconds.

One skilled in the art will appreciate that other magnetic nanoparticles may be used in lieu of, or in addition to, the magnetite. For example, cobalt ferrite nanoparticles may also be used.

In this example, the fabrication of polyelectrolyte capsules is based on the layer-by-layer (LbL) self-assembly of polyelectrolyte thin films. Such polyelectrolyte capsules are fabricated by the consecutive adsorption of alternating layer of positively and negatively charged polyelectrolytes onto sacrificial colloidal templates. Calcium carbonate is but one example of a sacrificial colloidal template. One skilled in the art will appreciate that other templates may be used in lieu of, or in addition to, calcium carbonate. For example, in accordance with other embodiments of the present disclosure, polyelectrolyte capsules may be templated on melamine formaldehyde or silica rather than carbonate.

The method 300 continues by LbL coating the $CaCO_3$ microparticles (operation 310). In operation 310, a polyelectrolyte multilayer (PEM) build-up may be employed by adsorbing five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the $CaCO_3$ microparticles produced in operation 305 may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolyte may be repeated five times and, consequently, five PSS/PAH bilayers are deposited on the surface of the $CaCO_3$ microparticles. One of the resulting polymer coated $CaCO_3$ microparticles is shown at stage 308.

Alternatively, as noted above, in operation 310, magnetic nanoparticles may be used in the polyelectrolyte multilayer (PEM) build-up. That is, magnetic nanoparticles may be incorporated into the "inner shell" polyelectrolyte multilayer for the purpose of adapting the inner shell of the shell-in-shell microcapsule to rupture in response to a magnetic field. The shell-in-shell microcapsule that results from this optional incorporation of magnetic nanoparticles into the inner shell is one example of a multi-compartment microcapsule as shown in FIG. 1C. For example, the $CaCO_3$ microparticles produced in operation 305 may be dispersed in a 0.5 M NaCl solution with $Fe_3O_4$ nanoparticles (citric acid modified, 2 mg/mL) and shaken continuously for 10 min. The excess magnetite nanoparticles may be removed by centrifugation and washing with deionized water. Then, 1 mL of 0.5 M NaCl solution containing 2 mg/mL PAH (polycation) may be added and shaken continuously for 10 min. The excess polycation may be removed by centrifugation and washing with deionized water. This deposition process may be repeated five times and, consequently, five $Fe_3O_4$/PAH bilayers are deposited on the surface of the $CaCO_3$ microparticles.

One skilled in the art will appreciate that other magnetic nanoparticles may be used in lieu of, or in addition to, the $Fe_3O_4$ nanoparticles. For example, cobalt ferrite nanoparticles may also be used.

The thickness of this "inner shell" polyelectrolyte multilayer may be varied by changing the number of bilayers. Generally, it is desirable for the inner shell to rupture while the outer shell remains intact so that the reactants and the reaction products do not contaminate the sealant or adhesive into which the multi-compartment microcapsule may be dispersed. Typically, for a given shell diameter, thinner shells rupture more readily than thicker shells. Hence, in accordance with some embodiments of the present disclosure, the inner shell is made relatively thin compared to the outer shell. On the other hand, the inner shell must not be so thin as to rupture prematurely.

The PSS/PAH-multilayer in operation 310 is but one example of a polyelectrolyte multilayer. One skilled in the art will appreciate that other polyelectrolyte multilayers and other coatings may be used in lieu of, or in addition to, the PSS/PAH-multilayer in operation 310.

The method 300 continues by preparing ball-in-ball calcium carbonate microparticles in which Reactant 2 (which can be any suitable oxidant, including hydrogen peroxide) is immobilized by a second coprecipitation (operation 315). "Immobilize" means "removing from general circulation, for example by enclosing in a capsule." The ball-in-ball $CaCO_3$ microparticles are characterized by a polyelectrolyte multilayer that is sandwiched between two calcium carbonate compartments. In operation 315, the polymer coated $CaCO_3$ microparticles may be resuspended in 1M $CaCl_2$ (0.615 mL), 1M $Na_2CO_3$ (0.615 mL), and deionized water (2.500 mL) containing hydrogen peroxide (1 mg), rapidly mixed and thoroughly agitated on a magnetic stirrer for about 20 seconds at about room temperature. After the agitation, the precipitate may be separated from the supernatant by centrifugation and washed three times with water. The second coprecipitation is accompanied by formation of a coproduct, i.e., single core $CaCO_3$ microparticles that contain only hydrogen peroxide. Hence, the resulting precipitate represents a mixture of ball-in-ball $CaCO_3$ microparticles and single core $CaCO_3$ microparticles. The ball-in-ball $CaCO_3$ microparticles, which are magnetic due to the magnetite nanoparticles incorporated in the inner compartment, may be isolated by applying an external magnetic field to the sample while all of the nonmagnetic single core $CaCO_3$ microparticles are removed by a few washing steps. One of the resulting ball-in-ball $CaCO_3$ microparticles is shown at stage 312.

The method 300 continues by LbL coating the ball-in-ball $CaCO_3$ microparticles (operation 320). In operation 320, a polyelectrolyte multilayer (PEM) build-up may be employed by adsorbing five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the ball-in-ball $CaCO_3$ microparticles produced in operation 315 may be dispersed in a 0.5 M NaCl solution with 2 mg/mL PSS (i.e., polyanion) and shaken continuously for about 10 min. The excess polyanion may be removed by centrifugation and washing with deionized water. Then, 1 mL of 0.5 M NaCl solution containing 2 mg/mL PAH (i.e., polycation) may be added and shaken continuously for about 10 min. The excess polycation may be removed by centrifugation and washing with deionized water. This deposition process of oppositely charged polyelectrolyte may be repeated five times and, consequently, five PSS/PAH bilayers are deposited on the surface of the ball-in-ball $CaCO_3$ microparticles. One of the resulting polymer coated ball-in-ball $CaCO_3$ microparticles is shown at stage 314.

The thickness of this "outer shell" polyelectrolyte multilayer may be varied by changing the number of bilayers. Generally, it is desirable for the inner shell to rupture while the outer shell remains intact so that the reactants and the reaction products do not contaminate the sealant or adhesive into which the multi-compartment microcapsule is dispersed. Typically, for a given shell diameter, thinner shells rupture more readily than thicker shells. Hence, in accordance with some embodiments of the present disclosure, the outer shell is made relatively thick compared to the inner shell.

The PSS/PAH-multilayer in operation 320, is but one example of a polyelectrolyte multilayer. One skilled in the art will appreciate that other polyelectrolyte multilayers and other coatings may be used in lieu of, or in addition to, the PSS/PAH-multilayer in operation 320. As noted above, coating polyelectrolyte multilayer capsules with lipids, for example, can result in a significant reduction of the capsule wall permeability.

In an embodiment, the outer shell wall material is made of a material for the chemiluminescent photon to escape the shell. In another embodiment, the outer shell wall material is made of a material where the photon yield outside the wall of the outer shell wall is maximized.

In an embodiment, the outer shell wall has a transmittance of at least 90%. In certain embodiments, the outer shell wall material may include natural polymeric material, such as gelatin, arabic gum, shellac, lac, starch, dextrin, wax, rosin, sodium alginate, zein, and the like; semi-synthetic polymer material, such as methyl cellulose, ethyl cellulose, carboxymethyl cellulose, hydroxyethyl ethyl cellulose; full-synthetic polymer material, such as polyolefins, polystyrenes, polyethers, polyureas, polyethylene glycol, polyamide, polyurethane, polyacrylate, epoxy resins, among others. In certain embodiments, the method for wrapping a core material, includes chemical methods such as interfacial polymerization, in situ polymerization, molecular encapsulation, radiation encapsulation; physicochemical methods such as aqueous phase separation, oil phase separation, capsule-heart exchange, pressing, piercing, powder bed method; and physical methods, such as spray drying, spray freezing, air suspension, vacuum evaporation deposition, complex coacervation, long and short centrifugation.

An example of a conventional technique of preparing the outer shell follows, and can be accomplished at stage 314. A gelatin is dissolved into n-hexane in a water bath at about 50° C. to obtain a 6% gelatin solution. The gelatin may optionally be swelled with deionized water before the preparation of the gelatin solution. The ball-in-ball $CaCO_3$ microparticles are added to the gelatin solution while stirring to form an emulsified dispersion system. The pH is then adjusted to about 3.5-3.8 using acetic acid, and then a 20% sodium sulfate solution is slowly added into the dispersion system while maintaining a temperature of about 50° C. The temperature of the dispersion system is then lowered to a temperature of about 15° C. The result is a colloid of gelatin coated ball-in-ball $CaCO_3$ microparticles.

Operation 325 is a $CaCO_3$ extraction. In operation 325, the $CaCO_3$ core of the ball-in-ball $CaCO_3$ microparticles may be removed by complexation with ethylenediaminetetraacetic acid (EDTA) (0.2 M, pH 7.5) leading to formation of shell-in-shell microcapsules. For example, the ball-in-ball $CaCO_3$ microparticles produced in operation 320 may be dispersed in 10 mL of the EDTA solution (0.2 M, pH 7.5) and shaken for about 4 h, followed by centrifugation and re-dispersion in fresh EDTA solution. This core-removing process may be repeated several times to completely remove the $CaCO_3$ core. The size of the resulting shell-in-shell microcapsules ranges from about 8 μm to about 10 μm and the inner core diameter is about 3 μm to about 5 One of the resulting shell-in-shell microcapsules is shown at stage 316. Depending on the application of use, the shell-in-shell microcapsule can have a range of about 0.5 μm to about 200 μm.

As noted above, the fabrication of polyelectrolyte capsules in method 300 is based on the layer-by-layer (LbL) self-assembly of polyelectrolyte thin films. One skilled in the art will appreciate that a multi-compartment microcapsule for photon generation in accordance with some embodiments of the present disclosure may be produced by other conventional multi-compartment systems, such as polymeric micelles, hybrid polymer microspheres, and two-compartment vesicles.

As noted above, one skilled in the art will understand that various chemiluminescent reactants and oxidants can be used. Moreover, the multi-compartment microcapsule can utilize various chemiluminescent reactions. The chemistry used in chemiluminescent reactions is a mature technology, and those skilled in the art will know that additional materials can be further added to the multi-compartment microcapsule. For example, enhancing reagents such as alkyl dimethyl benzyl quaternary ammonium salt may be added to the reactants.

While method 300 illustrated formation of shell-in-shell microcapsules wherein the inner shell is adapted to rupture in response to a stimuli (a compressive force and/or a magnetic field), the inner shell can be adapted to rupture in response to other forms of stimuli including heat and ultrasound.

Other embodiments may utilize more than two reactants. For example, the multi-compartment microcapsule 100 of FIG. 1A may contain a plurality of inner microcapsules, such as 102, and the inner microcapsules may themselves contain other, inner, microcapsules. The various microcapsules may contain reactants and may rupture under compression to allow the reactants to come into contact. Similarly, the multi-compartment microcapsule 110 of FIG. 1B may contain a plurality of compartments formed by a plurality of membranes or barriers, such as 114, and the compartments may in turn contain one or more membranes or barriers, or may contain microcapsules. The various membranes or barriers may rupture under compression to allow the reactants to come into contact. For example, one inner shell microcapsule contains reactants (A), and second inner microcapsule contains reactants (B), and the outer shell microcapsule contains reactants (C). Depending on the strength of the stimuli (i.e., compression), inner shell containing reactants (A) will rupture, while inner shell containing reactants (B) will not rupture.

Other embodiments may utilize more than one multi-compartment microcapsule, where the individual multi-compartment microcapsules have different strengths in response to a stimulus (e.g., compressive force, a magnetic field, ultrasound, heat, or combinations thereof). For example, one multi-compartment microcapsule may have an inner shell containing reactants (A), and the outer shell containing reactants (B). The other multi-compartment microcapsule may have an inner shell containing reactants (C) and the outer shell containing reactants (D). In this embodiment, multiple emission bands can be achieved depending on the strength of the applied stimulus. Emission 1 would comprise the chemiluminescent reaction of reactants (A) and (B) after a stimuli ruptures the inner shell of one microcapsule, while emission 2 would comprise the chemiluminescent reaction of (C) and (D) after a stimuli ruptures the inner shell of the other microcapsule.

The photon-emitting reactants may be chosen to be inert with respect to the material of the microcapsule walls, or an isolating barrier within a microcapsule when the reactants are not in contact. The photon-emitting reactants also may be chosen to be inert with respect to the outer microcapsule wall when the reactants are in contact, or such that the chemical products of the reaction are inert with respect to the outer microcapsule wall, and any remnants of the inner microcapsule wall or barrier.

An amount of the first reactant and an amount of the second reactant may be determined. The amounts may be determined from the total amount of the reactants required to produce a desired amount of photons, the ratio of each reactant according to a reaction equation, the desired dimensions of the microcapsule, and the manner of isolating the reactants within the capsule. For example, a microcapsule may be desired having a maximum dimension less than or equal to a desired final thickness of less than 0.5 microns, and the amount of reactants may be chosen corresponding to the volume available within a microcapsule formed according to that dimension.

One or more inner microcapsules, such as illustrated by microcapsule 102 of FIG. 1A, may be formed and the inner microcapsules may contain a first reactant(s) or a second reactant(s). In various embodiments, an inner microcapsule may be formed to contain an oxidant (such as hydrogen peroxide) or may be formed to contain chemiluminescent reactants (including luminol, dye, oxalates, other reactants described herein, and combinations thereof). The inner microcapsule(s) may be formed with a capsule wall configured to rupture with application of a compressive force.

Further, an outer microcapsule may be formed containing the inner microcapsule(s) and one or more other reactants, in the manner of multi-compartment microcapsule 100 in FIG. 1A. The reactant(s) contained in the outer microcapsule may be inert with respect to each other and the microcapsule walls until in contact with one or more reactants contained in one or more inner microcapsules. In one embodiment, an outer microcapsule may contain hydrogen peroxide, or other oxidizers, where one or more inner microcapsules contain chemiluminescent reactants (including, luminol, dye, and reactants described herein. In another embodiment, the outer microcapsule may contain chemiluminescent reactants (including, luminol, dye, and reactants described herein), where one or more inner microcapsules may contain hydrogen peroxide or other oxidizers. The capsule wall of the outer microcapsule may be formed to not rupture at the compressive force applied to rupture the capsule wall of the inner microcapsule.

Alternatively, an embodiment may utilize a microcapsule having a structure as illustrated by multi-compartment microcapsule 110 in FIG. 1B. In accordance with this alternative embodiment an outer microcapsule may be formed having one or more inner barriers 114, which may be membranes, in the manner of multi-compartment microcapsule 110 in FIG. 1B, forming two (or more) compartments within the outer microcapsule. The particular reactants described above may be contained within the compartments, and the inner barrier(s) may be formed to rupture at compressive forces such as described above with respect to the capsule wall of an inner microcapsule.

In another alternative, an embodiment may utilize a microcapsule having a structure as illustrated by multi-compartment microcapsule 120 in FIG. 1C. In accordance with this alternative embodiment, the capsule wall of the inner microcapsule (i.e., the inner shell of the multi-compartment microcapsule 120) may be formed with one or more magnetic nanoparticles so as to rupture under a particular magnetic field through magnetic stimulation of the one or more magnetic nanoparticles and the outer wall of the microcapsule (i.e., the outer shell of the multi-compartment microcapsule 120) may be formed so as to not rupture under that magnetic field. For example, as described above with reference to FIG. 3, for the purpose of adapting the inner shell of the shell-in-shell microcapsule to rupture in response to a magnetic field, magnetic nanoparticles may be incorporated into the "inner shell" polyelectrolyte multilayer (i.e., the "Polymer" shown at stage 308). The particular reactants described above may be contained within the compartments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A multi-compartment microcapsule comprising:
    a first compartment;
    a second compartment; and
    an isolating structure separating first and second compartments from each other and adapted to rupture in response to a stimulus, and
    wherein:
        the first and second compartments contain reactants that come in contact and react to produce photons when the isolating structure ruptures, and
        the multi-compartment microcapsule is a shell-in-shell microcapsule comprising an inner shell contained within an outer shell, wherein the inner shell encapsulates the first compartment, wherein the outer shell encapsulates the second compartment, wherein the inner shell defines the isolating structure, and wherein the inner shell and the outer shell are configured so that a stimulus ruptures the inner shell while the outer shell remains intact.

2. The multi-compartment microcapsule of claim 1, wherein the first compartment contains chemiluminescent reactants and the second compartment contains an oxidant.

3. The multi-compartment microcapsule of claim 2, wherein the oxidant is hydrogen peroxide.

4. The multi-compartment microcapsule of claim 1, wherein a given level of compressive force ruptures the inner shell while the outer shell remains intact.

5. The multi-compartment microcapsule of claim 1, wherein a given level of heat ruptures the inner shell while the outer shell remains intact.

6. The multi-compartment microcapsule of claim 1, further comprising magnetic nanoparticles in the inner shell.

7. The multi-compartment microcapsule of claim 1, wherein the outer shell comprises a polymer, and the outer shell has a transmittance of at least 90%.

8. The multi-compartment microcapsule of claim 7, wherein the polymer comprises gelatin, arabic gum, shellac, lac, starch, dextrin, wax, rosin, sodium alginate, zein, methyl cellulose, ethyl cellulose, carboxymethyl cellulose, hydroxyethyl ethyl cellulose, polyolefins, polystyrenes, polyethers, polyesters, polyureas, polyethylene glycol, polyamides, polyimides, urea-formaldehydes, polyurethane, polyacrylate, epoxy resins, or combinations thereof.

9. A multi-compartment microcapsule comprising:
a first compartment;
a second compartment; and
an isolating structure separating first and second compartments from each other and adapted to rupture in response to a stimulus, and
wherein:
the first and second compartments contain reactants that come in contact and react to produce photons when the isolating structure ruptures, and
the multi-compartment microcapsule is a shell-in-shell microcapsule comprising an inner shell contained within an outer shell, wherein the inner shell encapsulates the first compartment, wherein the outer shell encapsulates the second compartment, wherein the inner shell defines the isolating structure, and wherein the inner shell and the outer shell are configured so that a stimulus ruptures the inner shell while the outer shell remains intact, and
the inner shell encapsulates magnetic nanoparticles.

10. The multi-compartment microcapsule of claim 9, wherein the first compartment contains chemiluminescent reactants and the second compartment contains an oxidant.

11. The multi-compartment microcapsule of claim 10, wherein the oxidant is hydrogen peroxide.

12. The multi-compartment microcapsule of claim 10, wherein a given level of compressive force ruptures the inner shell while the outer shell remains intact.

13. A multi-compartment microcapsule comprising:
a first compartment;
a second compartment; and
an isolating structure separating first and second compartments from each other and adapted to rupture in response to a stimulus, and
wherein:
the first and second compartments contain reactants that come in contact and react to produce photons when the isolating structure ruptures,
the multi-compartment microcapsule is a shell-in-shell microcapsule comprising an inner shell contained within an outer shell, wherein the inner shell encapsulates the first compartment, wherein the outer shell encapsulates the second compartment, wherein the inner shell defines the isolating structure, and wherein the inner shell and the outer shell are configured so that a stimulus ruptures the inner shell while the outer shell remains intact, and
the outer shell comprises a polymer, and the outer shell has a transmittance of at least 90%.

14. The multi-compartment microcapsule of claim 13, wherein the first compartment contains chemiluminescent reactants and the second compartment contains an oxidant.

15. The multi-compartment microcapsule of claim 14, wherein the oxidant is hydrogen peroxide.

16. The multi-compartment microcapsule of claim 13, wherein the polymer comprises gelatin, arabic gum, shellac, lac, starch, dextrin, wax, rosin, sodium alginate, zein, methyl cellulose, ethyl cellulose, carboxymethyl cellulose, hydroxyethyl ethyl cellulose, polyolefins, polystyrenes, polyethers, polyesters, polyureas, polyethylene glycol, polyamides, polyimides, urea-formaldehydes, polyurethane, polyacrylate, epoxy resins, or combinations thereof.

17. The multi-compartment microcapsule of claim 13, wherein a given level of heat ruptures the inner shell while the outer shell remains intact.

18. The multi-compartment microcapsule of claim 13, wherein a given level of compressive force ruptures the inner shell while the outer shell remains intact.

\* \* \* \* \*